(12) United States Patent
Zhang et al.

(10) Patent No.: US 9,397,854 B2
(45) Date of Patent: Jul. 19, 2016

(54) NETWORK ACCESS METHOD, INTERFACE DEVICE, AND MOBILE NETWORK ACCESS DEVICE

(71) Applicant: Huawei Device Co., Ltd., Shenzhen (CN)

(72) Inventors: Kaibing Zhang, Xi'an (CN); Fuxin Song, Xi'an (CN); Zehui Sun, Shenzhen (CN); Guangze Zhu, Xi'an (CN); Xinchao Shui, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/336,139

(22) Filed: Jul. 21, 2014

(65) Prior Publication Data

US 2014/0334472 A1   Nov. 13, 2014

Related U.S. Application Data

(63) Continuation of application No. PCT/CN2013/070027, filed on Jan. 4, 2013.

(30) Foreign Application Priority Data

Apr. 24, 2012 (CN) .......................... 2012 1 0122586

(51) Int. Cl.
*H04L 12/28* (2006.01)
*H04W 84/00* (2009.01)
(Continued)

(52) U.S. Cl.
CPC ........... *H04L 12/2856* (2013.01); *H04W 48/17* (2013.01); *H04W 84/00* (2013.01); *H04W 84/12* (2013.01)

(58) Field of Classification Search
None
See application file for complete search history.

(56) References Cited

U.S. PATENT DOCUMENTS 7,076,270 B2 *  7/2006  Jaggers ............. H04M 1/72527
                                                          379/428.03
2002/0165990 A1  11/2002  Singhal et al.
(Continued)

FOREIGN PATENT DOCUMENTS

CN          1593035 A         3/2005
CN          1625205 A         6/2005
(Continued)

OTHER PUBLICATIONS

Partial English Translation and Abstract of Chinese Patent Application No. CN1625205, Sep. 15, 2015, 4 pages.
Foreign Communication From a Counterpart Application, Chinese Application No. 201210122586.X, Chinese Office Action dated Aug. 3, 2015, 15 pages.

(Continued)

*Primary Examiner* — Andrew Lai
*Assistant Examiner* — Jamaal Henson
(74) *Attorney, Agent, or Firm* — Conley Rose, P.C.; Grant Rodolph; Nicholas K. Beaulieu

(57) ABSTRACT

A network access method, an interface device, and a mobile network access device are provided. The interface device may specifically include: a first network port, a first processor, and a first universal serial bus (USB) interface, where the first USB interface is connected to the mobile network access device; the first network port is connected to a wired wide area network; and the first processor includes a detection unit and an instruction unit, where the detection unit is configured to detect whether the wired wide area network is available and the instruction unit is configured to send, when the detection unit detects that the wired wide area network is available, first network access instruction information to the mobile network access device by using the first USB interface.

19 Claims, 10 Drawing Sheets

(51) Int. Cl.
*H04W 84/12* (2009.01)
*H04W 48/00* (2009.01)

(56) References Cited

U.S. PATENT DOCUMENTS

| | | |
|---|---|---|
| 2005/0102431 A1 | 5/2005 | Maniatopoulos et al. |
| 2006/0094442 A1* | 5/2006 | Kirkup et al. |
| 2008/0194251 A1* | 8/2008 | Tischer .................. H04L 12/66 455/426.1 |
| 2010/0234051 A1 | 9/2010 | Holden et al. |
| 2011/0138196 A1 | 6/2011 | Magnuson et al. |
| 2012/0046074 A1 | 2/2012 | Gittleman et al. |
| 2012/0063432 A1 | 3/2012 | Hurd et al. |
| 2012/0155332 A1* | 6/2012 | Chang ................. H04M 1/2535 370/259 |
| 2012/0155445 A1* | 6/2012 | Javaregowda ...... H01L 65/1069 370/338 |
| 2013/0121311 A1 | 5/2013 | Shen |

FOREIGN PATENT DOCUMENTS

| | | |
|---|---|---|
| CN | 101001455 A | 7/2007 |
| CN | 201174708 Y | 12/2008 |
| CN | 101917313 A | 12/2010 |
| CN | 102143536 A | 8/2011 |
| JP | 2012044477 A | 3/2012 |

OTHER PUBLICATIONS

Partial English Translation and Abstract of Chinese Patent Application No. CN101001455A, Aug. 28, 2014, 4 pages.
Partial English Translation and Abstract of Chinese Patent Application No. CN201174708, Part 1, Aug. 28, 2014, 28 pages.
Partial English Translation and Abstract of Chinese Patent Application No. CN201174708, Part 1, Aug. 28, 2014, 8 pages.
Foreign Communication From a Counterpart Application, PCT Application No. PCT/CN2013/070027, English Translation of International Search Report dated Apr. 18, 2013, 2 pages.
Foreign Communication From a Counterpart Application, PCT Application No. PCT/CN2013/070027, Written Opinion dated Apr. 18, 2013, 6 pages.
Foreign Communication From a Counterpart Application, European Application No. 13780564.4, Extended European Search Report dated Apr. 28, 2015, 8 pages.
Foreign Communication From a Counterpart Application, Japanese Application No. 2014-555926, Japanese Office Action dated Nov. 4, 2015, 3 pages.
Foreign Communication From a Counterpart Application, Japanese Application No. 2014-555926, English Translation of Japanese Office Action dated Nov. 4, 2015, 3 pages.
Foreign Communication From A Counterpart Application, Chinese Application No. 201210122586.X, Chinese Notice of Allowance dated Apr. 18, 2016, 4 pages.

\* cited by examiner

NETWORK ACCESS METHOD, INTERFACE DEVICE, AND MOBILE NETWORK ACCESS DEVICE

CROSS-REFERENCE TO RELATED APPLICATIONS

This application is a continuation of International Application No. PCT/CN2013/070027, filed on Jan. 4, 2013, which claims priority to Chinese Patent Application No. 201210122586.X, filed on Apr. 24, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of communications technologies, and in particular, to a network access method, an interface device, and a mobile network access device.

BACKGROUND

A wide area network (WAN) is also called a remote network, which generally crosses a very large physical range and has a coverage range from dozens of kilometers to thousands of kilometers. A wide area network can connect multiple cities or countries or stretch across several continents, and can provide long-distance communication, to form an international remote network.

A local area network (LAN) refers to a computer communication network that is formed by interconnecting various computers, external devices, and databases in a local geographical range (for example, in a school, a factory, and an institution). A local area network can be connected to a distant local area network, database, or processing center by using a data communication network or a dedicated data circuit, to form an information processing system that covers a large range.

With development of communications technologies, a mobile network access device which includes a Second Generation (2G)/Third Generation (3G)/Fourth Generation (4G) module and a Wireless Fidelity (WiFi) module, supports wired network data transmission, and has a wireless access device (for example, access point (AP)) hotspot function, can access a wireless wide area network by using the 2G/3G/4G module, and establish a wireless local area network by using the WiFi module, so that another network accesses device accesses the wireless local area network to access the Internet. In this process, as a network node, the mobile network access device implements a connection between the wide area network and the local area network. The mobile network access device may be: a mobile phone, a wireless router, a tablet, or the like.

In a process of implementing the network access, the inventor discovers that the prior art has at least the following problem: due to reasons such as production cost and product size, the mobile network access device does not have a wired access function, and cannot access a wired wide area network by means of a wired network.

SUMMARY

Embodiments of the present invention provide a network access method, an interface device and a mobile network access device, which implement access of a mobile network access device to a wide area network by using a wired network without increasing production costs or increasing a product size of the wireless mobile network access device.

In order to achieve the foregoing objective, the embodiments of the present invention adopt the following technical solutions:

An interface device includes: a first network port, a first processor, and a first universal serial bus (USB) interface, where: the first USB interface is connected to a mobile network access device; the first network port is configured to connect to a wired wide area network; and the first processor includes: a detection unit and an instruction unit, where: the detection unit is configured to detect whether the wired wide area network is available; and the instruction unit is configured to: when the detection unit detects that the wired wide area network is available, send first network access instruction information to the mobile network access device by using the first USB interface, where the first network access instruction information is used to instruct the mobile network access device to initiate, by using the first USB interface and the first network port, a dialup request to the wired wide area network, so as to access the wired wide area network.

A mobile network access device includes: a second USB interface and a second processor, where: the second USB interface is connected to an interface device, and is configured to receive first network access instruction information from the interface device; and the second processor includes: a control unit and a dialup unit, where: the control unit is configured to instruct, according to the first network access instruction information, the dialup unit to send, by using the second USB interface and the interface device, a dialup request to a wired wide area network currently connected to the interface device, so as to access the wired wide area network.

A network access method is provided, where a network port is disposed on an interface device and used to connect to a wired wide area network, where the interface device is further connected to a mobile network access device by using a USB interface; and the method includes: detecting, by the interface device, whether the wired wide area network that is currently connected is available; and sending, by the interface device if the wired wide area network is available, first network access instruction information to the mobile network access device, where the first network access instruction information is used to instruct the mobile network access device to initiate, by using the interface device, a dialup request to the wired wide area network, so as to access the wired wide area network.

Another network access method is provided, where a mobile network access device is connected to an interface device by using a USB interface; and the method includes: receiving, by the mobile network access device, first network access instruction information from the interface device; and sending, according to the first network access instruction information, a dialup request to a wired wide area network currently connected to the interface device, so as to access the wired wide area network.

For the network access method, the interface device, and the mobile network access device according to the embodiments of the present invention, by using the foregoing solutions, after the interface device detects that a wired wide area network that is currently connected is available, the interface device sends first network access instruction information to the mobile network access device, where the first network access instruction information is used to instruct the mobile network access device to access the wired wide area network. In this way, the first mobile network access device can access the wired wide area network by using the interface device.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
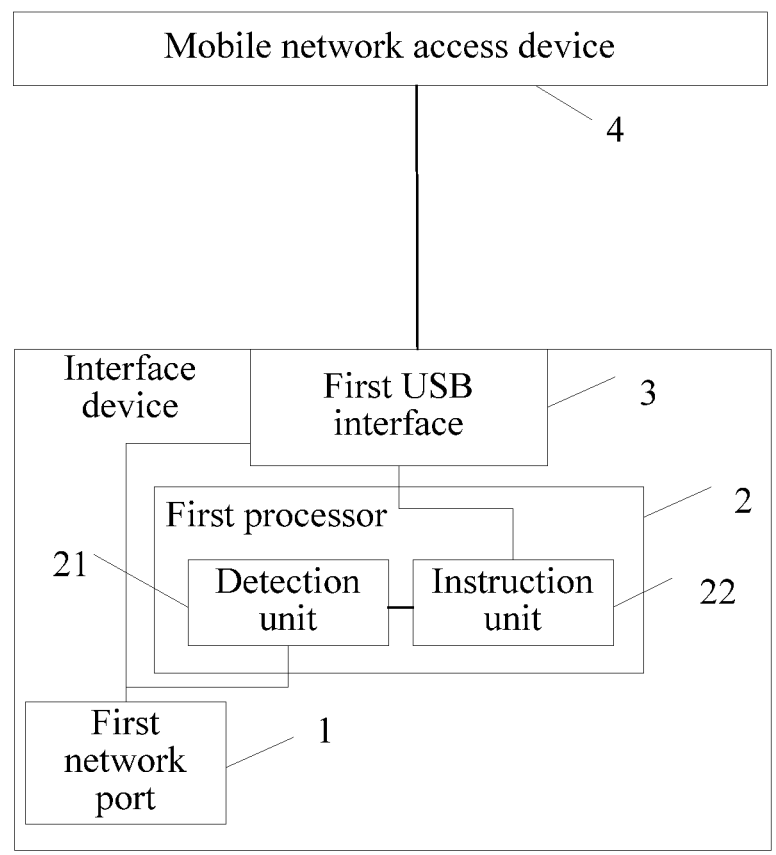
FIG. 1 is a schematic structural diagram of an interface device according to an embodiment of the present invention.

This embodiment provides an interface device, and as shown in FIG. 1, the interface device may include: a first network port 1, a first processor 2, and a first USB interface 3; where the first USB interface 3 is connected to a mobile network access device 4; the first network port 1 is configured to connect to a wired wide area network; and the first processor 2 includes a detection unit 21 and an instruction unit 22; where the detection unit 21 is configured to detect whether the wired wide area network is available; and the instruction unit 22 is configured to: when the detection unit 21 detects that the wired wide area network is available, send first network access instruction information to the mobile network access device 4 by using the first USB interface 3, where the first network access instruction information is used to instruct the mobile network access device 4 to initiate, by using the first USB interface 3 and the first network port 1, a dialup request to the wired wide area network, so as to access the wired wide area network.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network. In this way, the first mobile network access device can access the wired wide area network by using the interface device.

Embodiment 2

Figure 2:
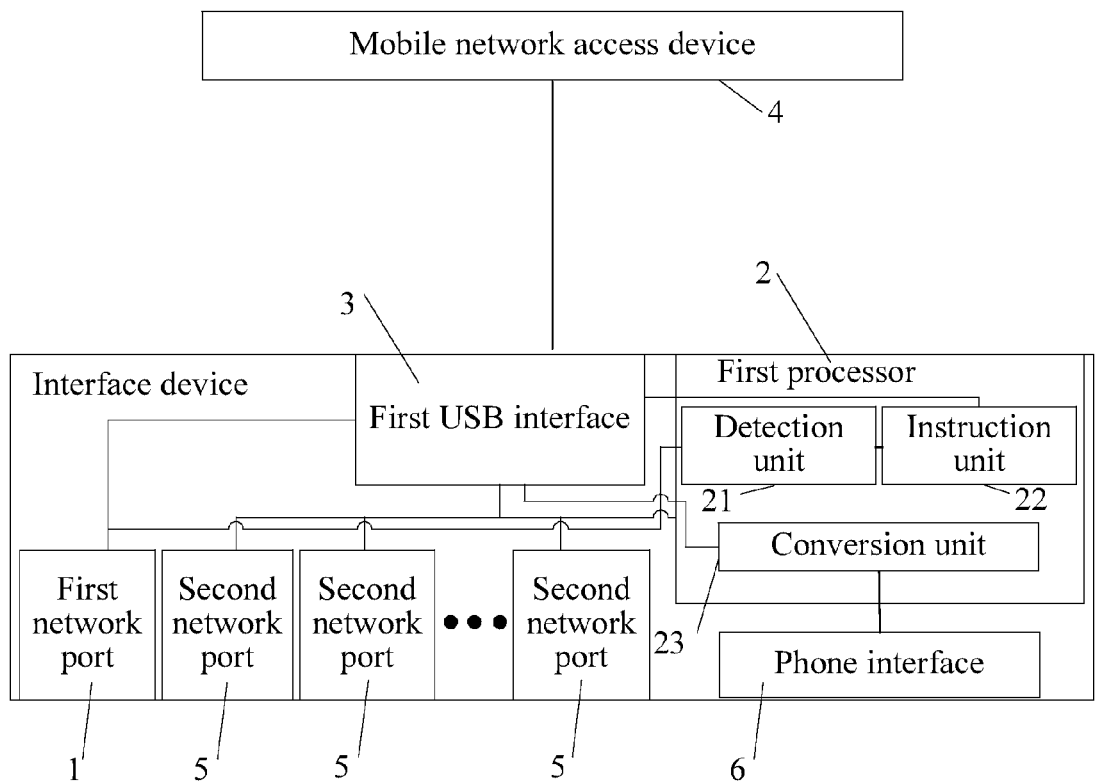
FIG. 2 is a schematic structural diagram of another interface device according to an embodiment of the present invention.

As an improvement on the Embodiment 1, this embodiment provides another interface device, and as shown in FIG. 2, the interface device may include: a first network port 1, a first processor 2, and a first USB interface 3; where the first USB interface 3 is connected to a mobile network access device 4; the first network port 1 is configured to connect to a wired wide area network; and the first processor 2 includes a detection unit 21 and an instruction unit 22; where the detection unit 21 is configured to detect whether the wired wide area network is available; and the instruction unit 22 is configured to: when the detection unit 21 detects that the wired wide area network is available, send first network access instruction information to the mobile network access device 4 by using the first USB interface 3, where the first network access instruction information is used to instruct the mobile network access device 4 to initiate, by using the first USB interface 3 and the first network port 1, a dialup request to the wired wide area network, so as to access the wired wide area network.

This embodiment does not limit the mobile network access device, which may be set according to an actual requirement, for example, may be a mobile phone, a computer, or the like, and details are not described herein.

Further, because the mobile network access device 4 may access the wired wide area network or the wireless wide area network, and the first network access instruction information is used to instruct the mobile network access device 4 to access, by using the first USB interface 3 and the first network port 1, the wired wide area network, the first network access instruction information is further configured to instruct the mobile network access device 4 to disconnect the mobile network access device 4 from the wireless wide area network.

Further, the instruction unit 22 is further configured to: when the detection unit 21 detects that the wired wide area network is unavailable, send second network access instruction information to the mobile network access device 4 by using the first USB interface 3, where the second network access instruction information is used to instruct the mobile network access device 4 to access the wireless wide area network.

Further, optionally, whether the wired wide area network is available is: whether the first network port 1 is connected to an available wired wide area network; and the detection unit 21 is specifically configured to detect whether the first network port 1 is connected to an available wired wide area network; and if it is detected that the first network port 1 is connected to an available wired wide area network, the instruction unit 22 sends first network access instruction information to the mobile network access device 4 by using the first USB interface 3.

Further, optionally, whether the wired wide area network is available is: whether the first network port 1 is enabled; and the detection unit 21 is specifically configured to detect whether the first network port 1 is enabled; and if it is detected that the first network port 1 is enabled, the instruction unit 22 sends the first network access instruction information to the mobile network access device 4 by using the first USB interface 3.

As an implementation manner of this embodiment, after the detection unit 21 detects that the wired wide area network is available, the detection unit 21 actively triggers the instruction unit 22 to send the first network access instruction information to the mobile network access device 4; or when the detection unit 21 detects that the wired wide area network is available, the instruction unit 22 is manually triggered to send the first network access instruction information to the mobile network access device 4.

Specifically, a manual triggering method may include: disposing a button on the interface device; and after the first network port 1 is connected to the wired wide area network, pressing, by a user, the button, and then sending, by the instruction unit 22, the first network access instruction information to the mobile network access device 4.

This embodiment does not limit the method for actively triggering or manually triggering the instruction unit 22 to send the first network access instruction information to the mobile network access device 4, which may be any method known to a person skilled in the art, and details are not described herein.

The mobile network access device 4 may not only access the wired wide area network by using the interface device, but also access the wireless wide area network by using a wireless network access module, such as a 2G/3G/4G module, built in the mobile network access device 4.

Further, the instruction unit 22 is further configured to: when the detection unit 21 detects that the wired wide area network is unavailable, send second network access instruction information to the mobile network access device 4 by using the first USB interface 3, where the second network access instruction information is used to instruct the mobile network access device 4 to access the wireless wide area network.

Further, the interface device further includes a second network port 5.

The second network port 5 is configured to connect to the first network access device, so that, when the mobile network access device 4 accesses the wired wide area network or the wireless wide area network and after a local area network with the mobile network access device 4 as an access hotspot is established, the first network access device accesses the local area network by using the second network port and the first USB interface. Further, the number of second network ports may be one, and may also be more than one, which is not limited by the present invention. The local area network may be a wired local area network, and may also be a wireless local area network, which may be set according to an actual requirement.

This embodiment does not limit the method for establishing the local area network with the mobile network access device 4 as an access hotspot, which is a method known to a person skilled in the art, and details are not described herein.

Further, the interface device further includes: a phone interface 6 configured to connect to a phone device; and the first processor 2 further includes a conversion unit 23; where the conversion unit 23 converts analog voice access request information received by using the phone interface 6 to digital voice access request information, the first processor 2 sends the digital voice access request information to the mobile network access device 4 by using the first USB interface 3, and the digital voice access request information is used to instruct the mobile network access device 4 to initiate, according to the digital voice access request information, an Internet Protocol (IP) telephony registration request to a wide area network connected to the mobile network access device, so that the phone device that sends the analog voice access request information executes an IP telephony service by means of the wide area network; and the conversion unit 23 is further configured to convert digital IP telephony data received by using the first USB interface 3 to analog IP telephony data, and send the analog IP telephony data to the phone device by using the phone interface 6; and the conversion unit 23 is further configured to convert digital IP telephony data received by using the first network port 1 to analog IP telephony data, and send the analog IP telephony data to the mobile network access device 4 by using the first USB interface 3.

The first processor 2 sends analog IP telephony data to the phone device by using the phone interface 6.

Information sent by the phone device to the interface device by using the phone interface 6 may only be analog information, and information processed by the mobile network access device 4 is digital information; therefore, before the interface device sends information to the mobile network access device 4 by using the first USB interface 3, the conversion unit 23 needs to convert the analog voice access request information received by using the phone interface 6 to digital voice access request information, so that the mobile network access device hackles the digital information, so that the phone device that sends the analog voice access request information executes an IP telephony service by means of the wide area network; in addition, before the mobile network access device 4 sends IP telephony data to the phone device by using the interface device, the conversion unit 23 converts the digital IP telephony data received by using the first USB interface 3 to analog IP telephony data.

This embodiment does not limit the method for the conversion unit 23 to convert analog information to digital information, or convert digital information to analog information, which is a method known to a person skilled in the art, and details are not described herein.

This embodiment does not limit the conversion unit, which may be set according to an actual requirement, for example, may include: a Real-time Transport Protocol (RTP) module, a digital signal processing (DSP) module, a software licensing internal code (SLIC) module, and the like, and details are not described herein.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network; and after the interface device detects that the wired wide area network that is currently connected is unavailable, the interface device sends the second network access instruction information to the mobile network access device, where the second network access instruction information is used to instruct the mobile network access device to access the wireless wide area network. In this way, the first mobile network access device can access the wired wide area network or the wireless wide area network.

In addition, after the mobile network access device accesses the wired wide area network or the wireless wide area network, the local area network with the mobile network access device can further be established, so that more first network access devices access the local area network.

Embodiment 3

Figure 3:
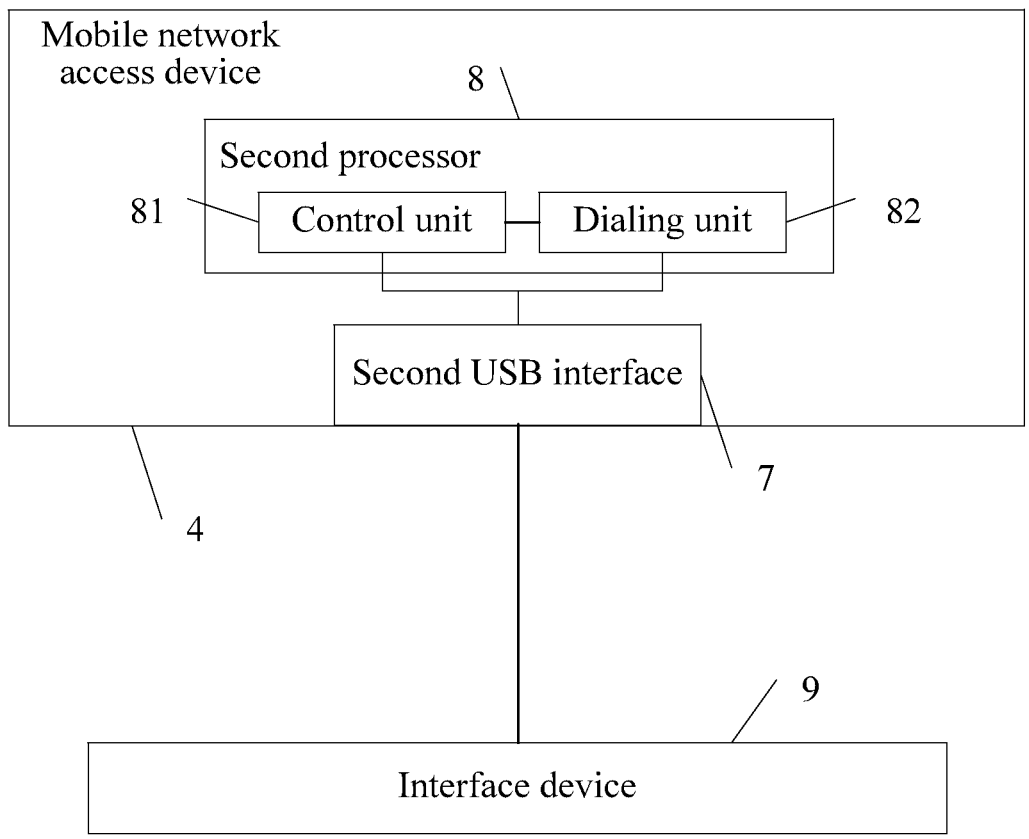
FIG. 3 is a schematic structural diagram of a mobile network access device according to an embodiment of the present invention.

This embodiment provides a network access device, and as shown in FIG. 3, the network access device may include a second USB interface 7 and a second processor 8; where the second USB interface 7 is connected to an interface device 9, and is configured to receive first network access instruction information from the interface device 9; and the second processor 8 includes a control unit 81 and a dialup unit 82; where the control unit 81 is configured to instruct, according to the first network access instruction information, the dialup unit 82 to send, by using the second USB interface 7 and the interface device 9, a dialup request to a wired wide area network currently connected to the interface device 9.

By using the foregoing solution, after the interface device 9 detects that the wired wide area network that is currently connected is available, the interface device 9 sends the first network access instruction information to the mobile network access device, where the first network access instruction information is used to instruct the mobile network access device to access the wired wide area network. In this way, the first mobile network access device can access the wired wide area network by using the interface device.

Embodiment 4

Figure 4:
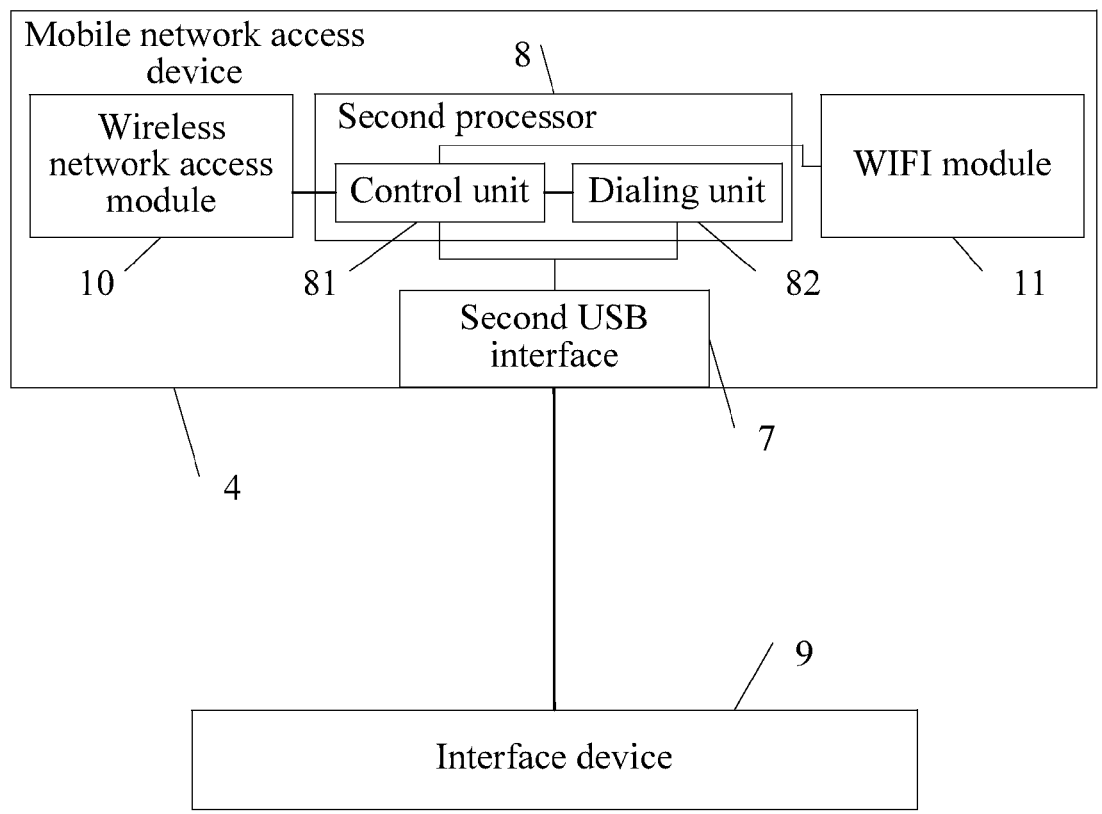
FIG. 4 is a schematic structural diagram of another mobile network access device according to an embodiment of the present invention.

As an improvement, this embodiment provides another network access device, and as shown in FIG. 4, the network access device includes a second USB interface 7 and a second processor 8; where the second USB interface 7 is connected to an interface device 9, and is configured to receive first network access instruction information from the interface device 9; and the second processor 8 includes a control unit 81 and a dialup unit 82; where the control unit 81 is configured to instruct, according to the first network access instruction information, the dialup unit 82 to send, by using the second USB interface 7 and the interface device 9, a dialup request to a wired wide area network currently connected to the interface device 9.

Further, the mobile network access device further includes a wireless network access module 10.

The second USB interface 7 is further configured to receive second network access information from the interface device 9.

The control unit 81 is further configured to instruct, according to the second network access instruction information, the wireless network access module 10 to access a wireless wide area network.

This embodiment does not limit the wireless network access module 10, which may be set according to an actual requirement, for example, may be a 2G/3G/4G module, and details are not described herein.

This embodiment does not limit the method for accessing a wireless wide area network by using the wireless network access module 10, which is a method known to a person skilled in the art, and details are not described herein.

Further, the control unit 81 is further configured to instruct, according to the first network access instruction information, the wireless network access module 10 to disconnect from the wireless wide area network.

Further, the mobile network access device further includes a WiFi module 11.

The control unit 81 is further configured to: after the mobile network access device 4 accesses the wired wide area network or the wireless wide area network, instruct the WiFi module 11 to establish a local area network with the mobile network access device 4 as an access hotspot.

Further, optionally, the mobile network access device 4 may establish a wireless local area network by using the WiFi module 11, so that a first network access device accesses a network in a wireless manner; or may establish a wired local area network by using the WiFi module 11 and the interface device 9, so that a second network access device accesses a network in a wired manner.

The WiFi module and the method for establishing a local area network by using the WiFi module that are provided by this embodiment are technologies known to a person skilled in the art, and details are not described herein.

Further, the second processor 8 is further configured to initiate, according to digital voice access request information received by using the second USB interface 7, an IP telephony registration request to a wide area network connected to the mobile network access device, so that a phone device that sends analog voice access request information corresponding to the digital voice access request information executes an IP telephony service by means of the wide area network.

As an implementation manner of this embodiment, the IP telephony service may be, but is not limited to, a Voice over Internet Protocol (VoIP) telephony service.

VoIP telephony performs digital processing, compression, encoding and packetizing on a voice signal, transmits the signal by using a network, and then performs decompression, and restores a digital signal to a voice, so that the other party in a call can hear the voice.

The biggest advantage of VoIP telephony is that it can widely utilize the Internet and an environment of global IP interconnections, thereby providing a user with more and better services than traditional services. VoIP telephony can cheaply transmit services such as voice, fax, video, and data over an IP network, for example, unified messaging, virtual telephony, virtual voice/fax mailbox, number query, Internet call center, Internet call management, video conferencing, e-commerce, fax storage and forwarding, and storage and forwarding of various information.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network; and after the interface device detects that the wired wide area network that is currently connected is unavailable, the interface device sends the second network access instruction information to the mobile network access device, where the second network access instruction information is used to instruct the mobile network access device to access the wireless wide area network. In this way, the first mobile network access device can access the wired wide area network or the wireless wide area network.

In addition, after the mobile network access device accesses the wired wide area network or the wireless wide area network, the local area network with the mobile network access device as an access hotspot can further be established, so that more first network access devices access the local area network.

Embodiment 5

Figure 5:
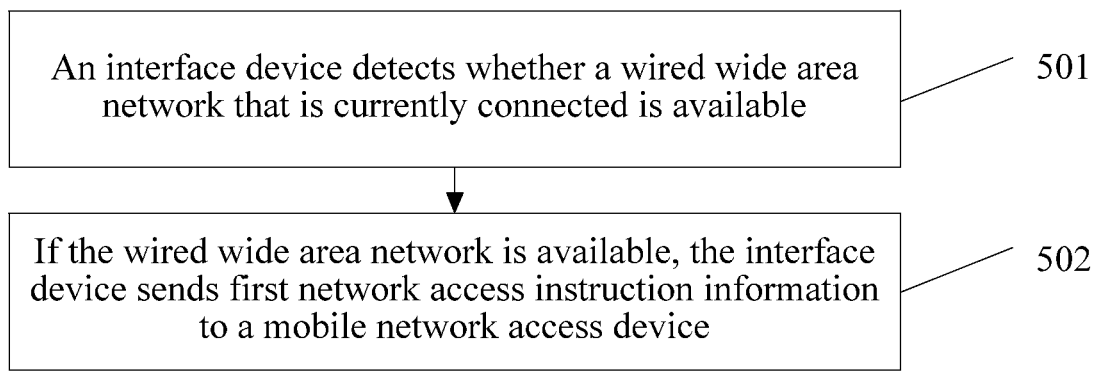
FIG. 5 is a flowchart of a network access method according to an embodiment of the present invention.

This embodiment provides a network access method, where a network port is disposed on an interface device and is used to connect to a wired wide area network, and the interface device is further connected to a mobile network access device by using a USB interface. Specifically, as shown in FIG. 5, the method may include the following steps:

501: The interface device detects whether the wired wide area network that is currently connected is available.

When the wired wide area network currently connected to the interface device is available, the mobile network access device may access the wired wide area network by using the interface device. Therefore, before the mobile network access device accesses the wired wide area network, the interface device first detects whether the wired wide area network that is currently connected is available.

502: If the wired wide area network is available, the interface device sends first network access instruction information to the mobile network access device, where the first network access instruction information is used to instruct the mobile network access device to initiate, by using the interface device, a dialup request to the wired wide area network, so as to access the wired wide area network.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network. In this way, the first mobile network access device can access the wired wide area network by using the interface device.

Embodiment 6

Figure 6:
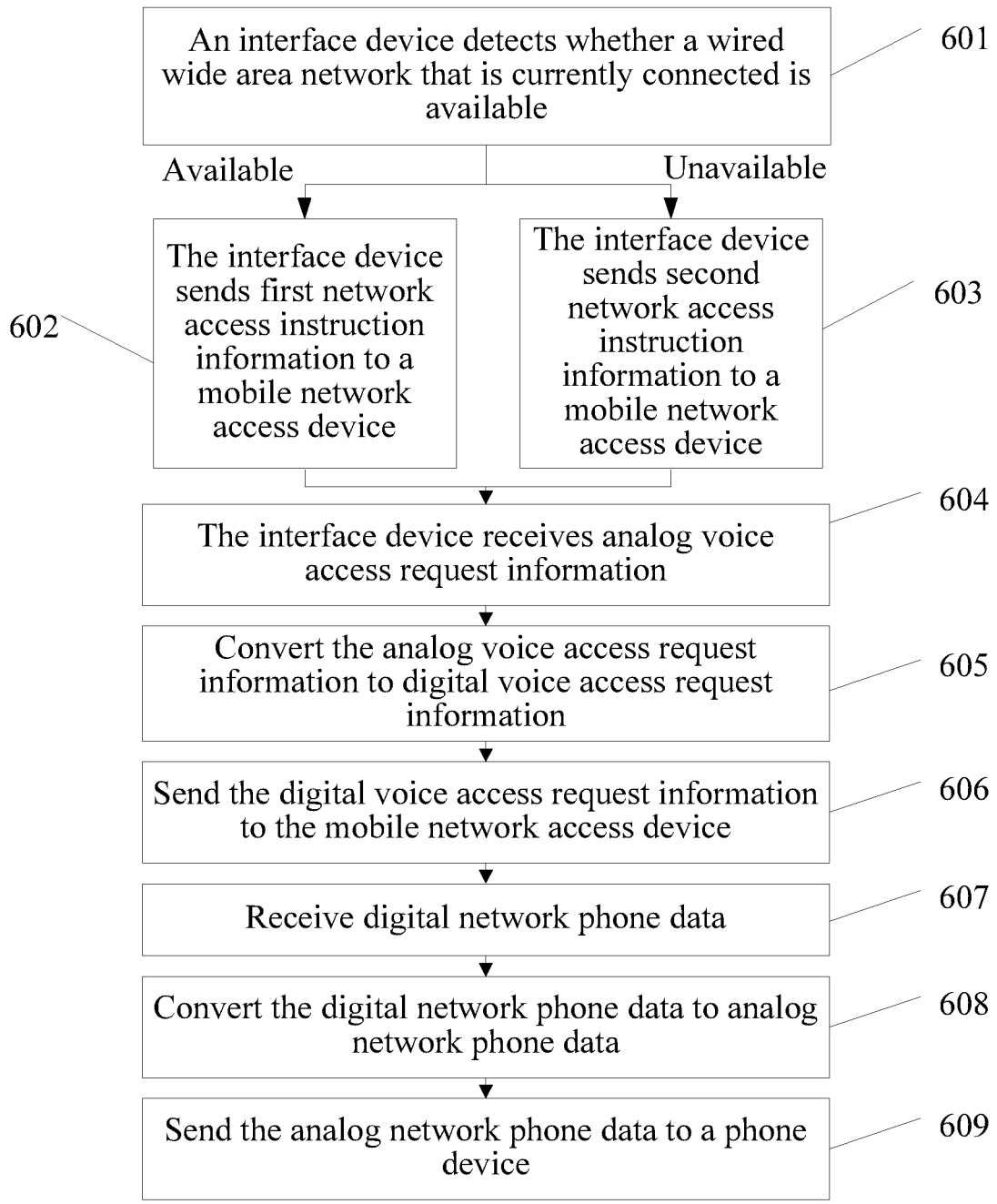
FIG. 6 is a flowchart of another network access method according to an embodiment of the present invention.

As an improvement, this embodiment provides another network access method, where a network port is disposed on an interface device and used to connect to a wired wide area network, where the interface device is further connected to a mobile network access device by using a USB interface. Specifically, as shown in FIG. 6, the method may include the following steps:

601: The interface device detects whether the wired wide area network that is currently connected is available.

When the wired wide area network currently connected to the interface device is available, the mobile network access device may access the wired wide area network by using the interface device. Therefore, before the mobile network access device accesses the wired wide area network, the interface device first detects whether the wired wide area network that is currently connected is available.

Further, optionally, the interface device may automatically or manually detect whether the wired wide area network that is currently connected is available. The automatically detecting, by the interface device, whether the wired wide area network that is currently connected is available may include: if whether the wired wide area network is available is whether a first network port is connected to an available wired wide area network, the detecting, by the interface device, whether the wired wide area network that is currently connected is available is: detecting, by the interface device, whether the first network port that is currently connected is connected to an available wired wide area network; or, if whether the wired wide area network is available is whether the first network port is enabled, the detecting, by the interface device, whether the wired wide area network that is currently connected is available is: detecting, by the interface device, whether the first network port is enabled.

The manually detecting, by using the interface device, whether the wired wide area network that is currently connected is available may include: disposing a button on the interface device; and after the interface device is connected to the wired wide area network, pressing, by a user, the button, and then sending, by the interface device, the first network access instruction information to the mobile network access device.

This embodiment does not limit the method for actively triggering or manually triggering the interface device to send the first network access instruction information to the mobile network access device, which may be any method known to a person skilled in the art, and details are not described herein.

Specifically, if the wired wide area network is available, step 602 is performed; and if the wired wide area network is unavailable, step 603 is performed.

602: If the wired wide area network is available, the interface device sends first network access instruction information to the mobile network access device, where the first network access instruction information is used to instruct the mobile network access device to initiate, by using the interface device, a dialup request to the wired wide area network, so as to access the wired wide area network.

Further, optionally, if whether the wired wide area network is available is whether the first network port is connected to an available wired wide area network, and if the wired wide area network is available, that the interface device sends first network access instruction information to the mobile network access device is that: if the first network port is connected to an available wired wide area network, the interface device sends the first network access instruction information to the mobile network access device.

Further, optionally, if whether the wired wide area network is available is whether the first network port is enabled, and if the wired wide area network is available, that the interface device sends first network access instruction information to the mobile network access device is that: if the first network port is enabled, the interface device sends the first network access instruction information to the mobile network access device.

Further, optionally, the first network access instruction information is further used to instruct the mobile network access device to disconnect the mobile network access device from the wireless wide area network.

The mobile network access device may access the wired wide area network or the wireless wide area network. Because the first network access instruction information is used to instruct the mobile network access device to access, by using the interface device, the wired wide area network, after receiving the first network access instruction information, the mobile network access device disconnects the mobile network access device from the wireless wide area network.

Step 604 is performed.

603: The interface device sends second network access instruction information to the mobile network access device, where the second network access instruction information is used to instruct the mobile network access device to access a wireless wide area network.

If the wired wide area network is unavailable, the mobile network access device may access a wireless wide area network, and therefore the interface device sends the second network access instruction information to the mobile network access device, so that the mobile network access device accesses a wireless wide area network.

This embodiment does not limit the method for the mobile network access device to access a wireless wide area network, which is a method known to a person skilled in the art, and may be implemented in any method known to a person skilled in the art, and details are not described herein.

Figure 7:
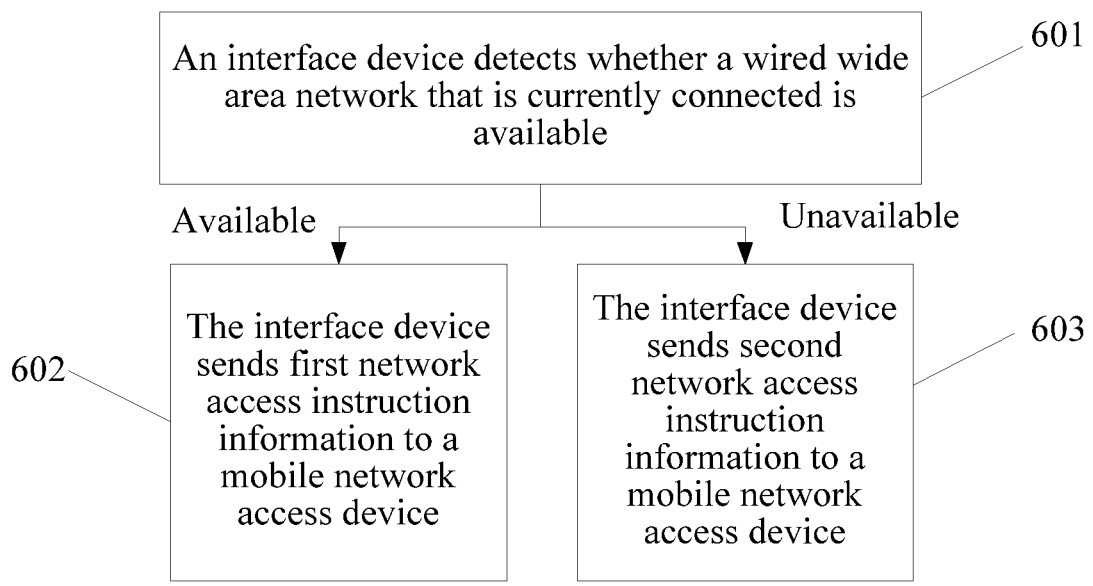
FIG. 7 is a flowchart of another network access method according to an embodiment of the present invention.

FIG. 7 is a flowchart of step 601 to step 603.

604: The interface device receives analog voice access request information.

After the mobile network access device accesses the wired wide area network or the wireless wide area network, in order that a common phone can execute an IP telephony service by using the interface device or the mobile network access device, the interface device receives analog voice access request information sent by the phone device.

605: Convert the analog voice access request information to digital voice access request information.

606: Send the digital voice access request information to the mobile network access device, where the digital voice access request information is used to instruct the mobile network access device to initiate, according to the digital voice access request information, an IP telephony registration request to the wide area network connected to the mobile network access device, so that a phone device that sends the analog voice access request information executes an IP telephony service by means of the wide area network.

The wide area network connected to the mobile network access device may be the wired wide area network or the wireless wide area network, which is not limited herein.

607: Receive digital IP telephony data.

After the phone device accesses a wide area network, the phone device needs to perform data transmission with the wide area network, to implement execution of the IP telephony service.

The interface device receives the digital IP telephony data sent by the wide area network, and sends the digital IP telephony data to the mobile network access device by using a first USB interface 3, and then the mobile network access device sends the digital IP telephony data to the interface device.

608: Convert the digital IP telephony data to analog IP telephony data.

Because the phone device can only recognize analog information, the interface device converts the digital IP telephony data received by using the first USB interface 3 to analog IP telephony data.

609: Send the analog IP telephony data to the phone device.

Further, optionally, after the mobile network access device accesses the wide area network and a local area network with the mobile network access device as an access hotspot is established, the first network access device may further send an access request to a local area network by using the interface device, so as to access the local area network.

The first network access device provided by this embodiment may be the mobile network access device or a non-mobile network access device, and may be set according to an actual requirement, and details are not described herein.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network; and after the interface device detects that the wired wide area network that is currently connected is unavailable, the interface device sends the second network access instruction information to the mobile network access device, where the second network access instruction information is used to instruct the mobile network access device to access the wireless wide area network. In this way, the first mobile network access device can access the wired wide area network or the wireless wide area network.

In addition, after the mobile network access device accesses the wired wide area network or the wireless wide area network, the local area network with the mobile network access device as an access hotspot can further be established, so that more first network access devices access the local area network.

Embodiment 7

Figure 8:
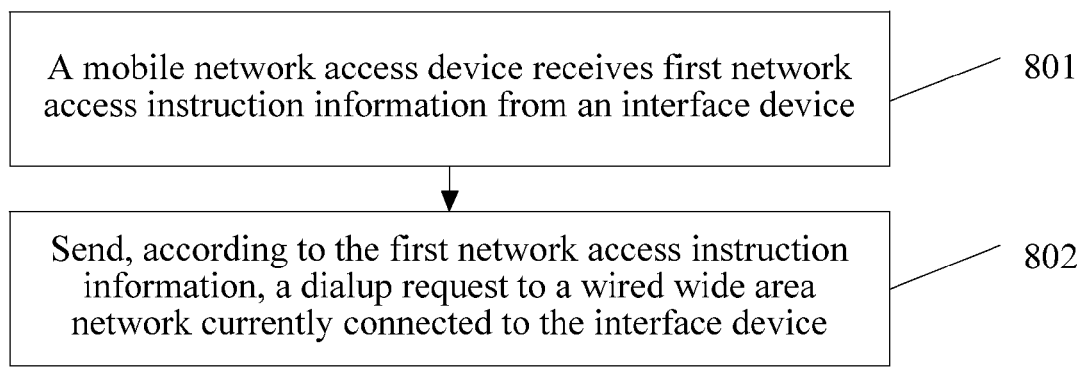
FIG. 8 is a flowchart of another network access method according to an embodiment of the present invention.

This embodiment provides a network access method, where the method is executed by a mobile network access device. A USB interface is disposed on the mobile network access device, and the mobile network access device is connected to an interface device by using the USB interface. As shown in FIG. 8, the method may include the following steps:

801: The mobile network access device receives first network access instruction information from the interface device.

802: Send, according to the first network access instruction information, a dialup request to a wired wide area network currently connected to the interface device, so as to access the wired wide area network.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network. In this way, the first mobile network access device can access the wired wide area network by using the interface device.

Embodiment 8

As an improvement, this embodiment provides another network access method, where the method is executed by a mobile network access device. A USB interface is disposed on the mobile network access device, and the mobile network access device is connected to an interface device by using the USB interface.

Figure 9:
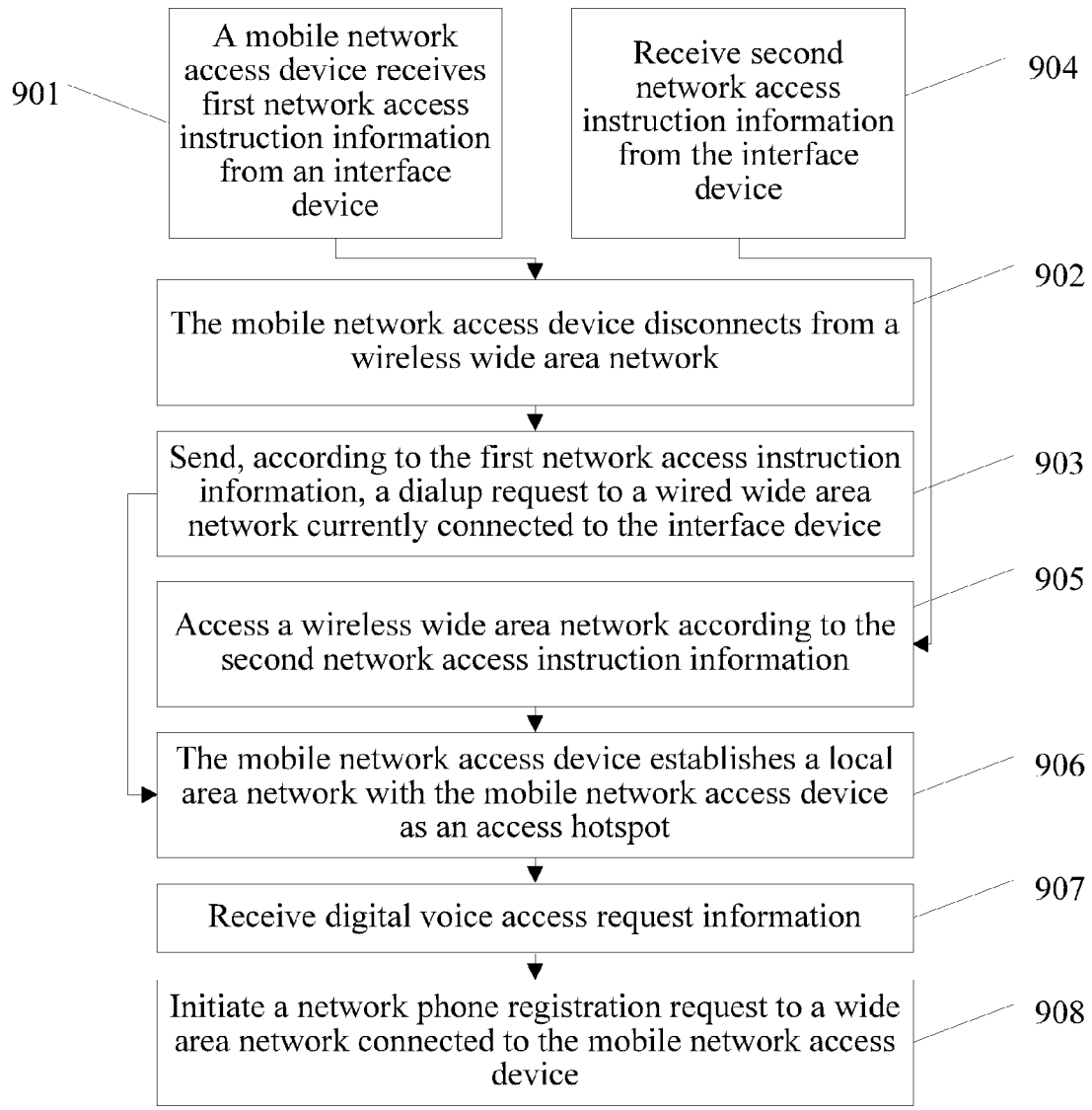
FIG. 9 is a flowchart of another network access method according to an embodiment of the present invention.

Specifically, if what the mobile network access device receives is first network access instruction information, step 904 is performed; if what the mobile network access device receives is second network access instruction information, step 901 is performed. As shown in FIG. 9, the method may include the following steps:

901: The mobile network access device receives first network access instruction information from the interface device.

902: The mobile network access device disconnects from a wireless wide area network.

The mobile network access device may be connected to a wireless wide area network, but the first network access instruction information is used to instruct the mobile network access device to access a wired wide area network. Therefore, after receiving the first network access instruction information, the mobile network access device disconnects from the wireless wide area network.

This embodiment does not limit the method for the mobile network access device to access a wireless wide area network, which may be any method known to a person skilled in the art, and details are not described herein.

903: Send, according to the first network access instruction information, a dialup request to a wired wide area network currently connected to the interface device, so as to access the wired wide area network.

As an implementation manner of this embodiment, the mobile network access device sends, according to the received first network access instruction information, the dialup request to the wired wide area network currently connected to the interface device, where the dialup request may include address information of the mobile network access device, so that the wired wide area network allocates a network address to the mobile network access device after determining that the mobile network access device can access the network. The network address may be, but is not limited to, an IP address, and the mobile network access device performs data transmission with the wired wide area network by using the IP address.

Step 906 is performed.

904: Receive second network access instruction information from the interface device.

905: Access a wireless wide area network according to the second network access instruction information.

This embodiment does not limit the method for the mobile network access device to access a wireless wide area network. For example, the method may be, but is not limited to, accessing a wireless wide area network by using a 3G/4G module that is configured inside the mobile network access device, and details are not described herein.

906: After the mobile network access device accesses the wired wide area network or the wireless wide area network, the mobile network access device establishes a local area network with the mobile network access device as an access hotspot.

In order that at least one first network access device can access a network by using the mobile network access device, after the mobile network access device accesses the wired wide area network or the wireless wide area network, the mobile network access device establishes the local area network with the mobile network access device as an access hotspot.

Further, optionally, the first network access device may access a wired local area network by using the mobile network access device and the interface device; and may also access the wireless local area network by using a WiFi module in the mobile network access device.

As an implementation manner of this embodiment, the accessing a wired local area network by using the mobile network access device and the interface device may include: sending, by the first network access device, a local area network access request to the mobile network access device by using the interface device, where the local area network access request may include identification information of the first network access device; initiating, by the mobile network access device according to the local area network access request, an access request to the local area network; and when the first network access device is allowed to access the local area network, allocating a network address to the first network access device, and sending the network address to the first network access device by using the mobile network access device and the interface device, so that the first network access device performs data transmission with the local area network.

This embodiment does not limit the method for the mobile network access device to access a wired local area network by using the mobile network access device and the interface device. For example, the mobile network access device may access the wired local area network by using a second network port on the interface device, where the second network port may be the second network port provided in "Embodiment 2", and details are not described herein.

907: Receive digital voice access request information.

When the phone device executes an IP telephony service by means of the wide area network connected to the mobile network access device, the phone device first sends voice access request information to the mobile network access device by using the interface device.

Specifically, after converting analog voice access request information sent by the phone device to digital voice access request information, the interface device sends the digital voice access request information to the mobile network access device, where both the analog voice access request information and the digital voice access request information may include, but are not limited to, identification information of the phone device.

908: Initiate an IP telephony registration request to the wide area network connected to the mobile network access device, so that the phone device that sends analog voice access request information corresponding to the digital voice access request information executes the IP telephony service by means of the wide area network.

After receiving the digital voice access request information, the mobile network access device initiates the IP telephony registration request to the wide area network, where the IP telephony registration request may include, but is not limited to: address information or the identification information of the phone device, so that the wide area network determines, according to the registration request, that the phone device is allowed to access the wide area network, and then the wide area network allocates a network resource to the phone device, so that the phone device that sends the analog voice access request information corresponding to the digital voice access request information executes the IP telephony service by means of the wide area network.

Figure 10:
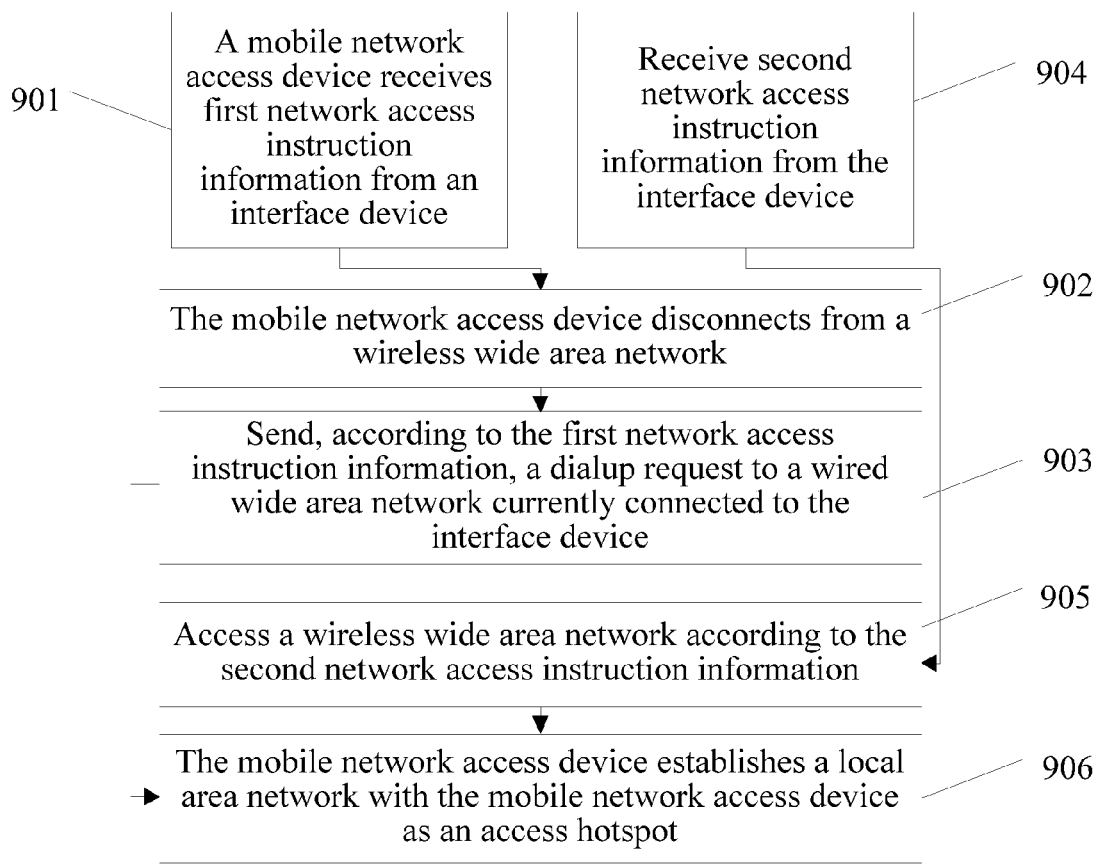
FIG. 10 is a flowchart of another network access method according to an embodiment of the present invention.

FIG. 10 is a flowchart of a network access method not supporting the IP telephony service.

By using the foregoing solution, after the interface device detects that the wired wide area network that is currently connected is available, the interface device sends the first network access instruction information to the mobile network access device, where the first network access instruction information is used to instruct the mobile network access device to access the wired wide area network; and after the interface device detects that the wired wide area network that is currently connected is unavailable, the interface device sends the second network access instruction information to the mobile network access device, where the second network access instruction information is used to instruct the mobile network access device to access the wireless wide area network. In this way, the first mobile network access device can access the wired wide area network or the wireless wide area network.

In addition, after the mobile network access device accesses the wired wide area network or the wireless wide area network, the local area network with the mobile network access device as an access hotspot can further be established, so that more first network access devices access the local area network.

In the several embodiments provided in this application, it should be understood that the disclosed apparatuses and methods may be implemented in other manners. For example, the described apparatus embodiments are merely exemplary. For example, the division of units is merely a division of logical functions and there may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or not be physically separate, and parts displayed as units may be or not be physical units, that is, may be located in one position, or may be distributed on a plurality of network units. A part or all of the units may be selected according to actual needs to achieve the objectives of the solutions of the embodiments.

In addition, functional units, for example, the detection unit and the instruction unit of the interface device, or the dialup unit and the control unit of the mobile network access device, in the embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

Through the foregoing description of the embodiments, a person skilled in the art can clearly understand that the present invention may be implemented by software plus necessary universal hardware, and definitely may also be implemented by hardware. However, under most circumstances, the former is preferred. Based on such an understanding, the technical solutions of the present invention essentially, or the part contributing to the prior art may be implemented in a form of a software product. The computer software product is stored in a readable storage medium, for example, a floppy disk, a hard disk, or an optical disc of a computer, and includes several instructions for instructing a computer device (which may be a personal computer, a server, or a network device) to execute the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interface device, comprising:
a first network port;
a first processor;
and a first universal serial bus (USB) interface, wherein the first USB interface is connected to a mobile network access device, wherein the first network port is configured to connect to a wired wide area network, wherein the first processor is configured to:
detect whether the wired wide area network is available to the interface device; and send a first network access instruction information to the mobile network access device by using the first USB interface when the wired wide area network is available,
and wherein the first network access instruction information instructs the mobile network access device to initiate, by using the first USB interface and the first network port, a dialup request to the wired wide area network to access the wired wide area network.

2. The interface device according to claim 1, wherein the first processor is further configured to send second network access instruction information to the mobile network access device by using the first USB interface when the wired wide area network is unavailable, and wherein the second network access instruction information is used to instruct the mobile network access device to access a wireless wide area network.

3. The interface device according to claim 1, wherein the first network access instruction information is further configured to instruct the mobile network access device to disconnect the mobile network access device from a wireless wide area network.

4. The interface device according to claim 1, wherein whether the wired wide area network is available comprises whether the first network port is connected to an available wired wide area network, wherein the first processor is configured to detect whether the first network port is connected to an available wired wide area network, and wherein the first processor sends the first network access instruction information to the mobile network access device by using the first USB interface when the first network port is connected to an available wired wide area network.

5. The interface device according to claim 1, wherein whether the wired wide area network is available comprises whether the first network port is enabled, wherein the first processor is configured to detect whether the first network port is enabled, and wherein the first processor sends the first network access instruction information to the mobile network access device by using the first USB interface when the first network port is enabled.

6. The interface device according to claim 1, wherein the interface device further comprises a second network port, wherein the second network port is configured to connect to a first network access device, such that, when the mobile network access device accesses the wired wide area network or the wireless wide area network and after connecting to a local area network established by the mobile network access device when functioning as an access hotspot, the first network access device accesses the local area network by using the second network port and the first USB interface.

7. The interface device according to claim 1, wherein the interface device further comprises a phone interface configured to connect to a phone device, wherein the first processor is configured to:
convert analog voice access request information received by using the phone interface to digital voice access request information; and
send the digital voice access request information to the mobile network access device by using the first USB interface, wherein the digital voice access request information is used to instruct the mobile network access device to initiate, according to the digital voice access request information, an Internet Protocol (IP) telephony registration request to a wide area network connected to the mobile network access device such that the phone device executes an IP telephony service by means of the wide area network, wherein the first processor is further configured to:
convert digital IP telephony data received by using the first USB interface to analog IP telephony data; and
send the analog IP telephony data to the phone device by using the phone interface, and wherein the first processor is further configured to:
convert digital IP telephony data received by using the first network port to analog IP telephony data; and send the analog IP telephony data to the mobile network access device by using the first USB interface.

8. A mobile network access device, comprising: a second universal serial bus (USB) interface;
and a second processor, wherein the second USB interface is connected to an interface device and is configured to receive a first network access instruction information from the interface device, wherein the second processor is configured to send, according to the first network access instruction information and by using the second USB interface and the interface device, a dialup request to a wired wide area network currently connected to the interface device to access the wired wide area network, and wherein the mobile network access device is configured to establish a local area network after accessing the wired wide area network according to the first network access instruction information received from the interface device.

9. The mobile network access device according to claim 8, wherein the mobile network access device further comprises a wireless network access module, wherein the second USB interface is further configured to receive second network access information from the interface device, and wherein the second processor is further configured to instruct, according to the second network access instruction information, the wireless network access module to access a wireless wide area network.

10. The mobile network access device according to claim 9, wherein the mobile network access device further comprises a Wireless Fidelity (WiFi) module, wherein the second processor is further configured to instruct the WiFi module to establish the local area network with the mobile network access device as a wireless access hotspot after the mobile network access device accesses the wired wide area network or the wireless wide area network, and wherein the local area network is a wireless local area network.

11. The mobile network access device according to claim 8, wherein the second processor is further configured to instruct, according to the first network access instruction information, the wireless network access module to disconnect from a wireless wide area network.

12. The mobile network access device according to claim 8, wherein the second processor is further configured to initiate, according to digital voice access request information received by using the second USB interface, an Internet Protocol (IP) telephony registration request to a wide area network connected to the mobile network access device such that a phone device that sends analog voice access request information corresponding to the digital voice access request information executes an IP telephony service by means of the wide area network.

13. The mobile network access device according to claim 8, wherein the local area network is a wired local area network established by the mobile network access device and the interface device.

14. A network access method, wherein a network port is disposed on an interface device and used to connect to a wired wide area network, wherein the interface device is further connected to a mobile network access device by using a universal serial bus (USB) interface, and wherein the method comprises:
detecting, by the interface device, whether the wired wide area network that is currently connected is available to the interface device;
and sending, by the interface device when the wired wide area network is available, a first network access instruction information to the mobile network access device, wherein the first network access instruction information instructs the mobile network access device to initiate, by using the interface device, a dialup request to the wired wide area network to access the wired wide area network.

15. The network access method according to claim 14, wherein the method further comprises sending, by the interface device when the wired wide area network is unavailable, second network access instruction information to the mobile network access device, wherein the second network access instruction information is used to instruct the mobile network access device to access a wireless wide area network.

16. The network access method according to claim 14, wherein the first network access instruction information is further used to instruct the mobile network access device to disconnect the mobile network access device from a wireless wide area network.

17. The network access method according to claim 14, wherein whether the wired wide area network is available comprises whether the first network port is connected to an available wired wide area network, wherein detecting, by the interface device, whether the wired wide area network that is currently connected is available comprises detecting, by the interface device, whether the first network port that is currently connected is connected to an available wired wide area network, and wherein sending, by the interface device when the wired wide area network is available, first network access instruction information to the mobile network access device comprises sending, by the interface device when the first network port is connected to an available wired wide area network, the first network access instruction information to the mobile network access device.

18. The network access method according to claim 14, wherein whether the wired wide area network is available comprises whether the first network port is enabled, wherein detecting, by the interface device, whether the wired wide area network that is currently connected is available comprises detecting, by the interface device, whether the first network port is enabled, and wherein sending, by the interface device when the wired wide area network is available, first network access instruction information to the mobile network access device comprises sending, by the interface device when the first network port is enabled, the first network access instruction information to the mobile network access device.

19. The network access method according to claim 14, wherein the method further comprises:
receiving, by the interface device, analog voice access request information;
converting the analog voice access request information to digital voice access request information;
sending the digital voice access request information to the mobile network access device, wherein the digital voice access request information is used to instruct the mobile network access device to initiate, according to the digital voice access request information, an Internet Protocol (IP) telephony registration request to a wide area network connected to the mobile network access device such that a phone device that sends the analog voice access request information executes an IP telephony service by means of the wide area network;
receiving digital IP telephony data;
converting the digital IP telephony data to analog IP telephony data; and
sending the analog IP telephony data to the phone device.

* * * * *